3,259,569
FLOCCULATION OF SEWAGE HAVING CONTROLLED SOLIDS CONCENTRATIONS
Charles P. Priesing, 5717 Leeway Drive, and Stanley Mogelnicki, 4612 Hampshire Court, both of Midland, Mich.
No Drawing. Filed Oct. 8, 1963, Ser. No. 314,603
7 Claims. (Cl. 210—46)

The present invention concerns a novel flocculation process for the clarification of sewage and similar aqueous suspensions of organic particles. More particularly, the invention concerns a process for flocculating sewage solids in aqueous suspension wherein the concentration of solids is controlled.

Within recent years, numerous publications and patents have appeared containing teachings to the end that suspensions of organic solids such as sewage can be flocculated and settled to effect clarification thereof through the use of appropriate organic polymeric flocculants. Generally, such suspensions comprise negatively charged organic particles and thus the polymeric flocculants most often found to be effective are cationic in nature. However, on occasion, a suspension of organic particles may be amenable to flocculation with an anionic polymer, particularly if the suspension has incorporated therein a sufficient amount of a soluble cationic chemical that the particles in suspension take on a positive charge.

While good results have been achieved in a few instances, the polymer promoted flocculation processes, as presently practiced, are usually uneconomical for large scale clarification operations such as those required for most municipal and industrial waste streams. It would be desirable, and it is an object of the present invention, to provide an efficient flocculation process whereby more complete separation of disperse organic solids from aqueous media is achieved with organic polymeric flocculants. Particularly, it is an object to provide a flocculation process whereby enhanced removals of sewage solids and other water contaminants is achieved. These and other objects are accomplished in accordance with the present invention founded upon the discovery hereinafter described.

In accordance with the present invention, it has been discovered that more efficient and complete removal of organic solids from an aqueous suspension thereof, by flocculation with organic polymeric flocculants, is achieved by incorporating into the suspension controlled amounts of previously settled essentially organic solids. Illustrative of sources for such solids are the raw and activated sewage sludges conventionally produced in municipal and industrial waste treatment plants. The word activated, as used herein, applies to a sewage sludge resulting from the sequential biological oxidation of raw sewage, which may have been subjected to a primary clarification treatment prior to oxidation, followed by flocculation and settling operations to recover the oxidized organic solids as an underflow sludge. A raw sewage sludge is produced by subjecting a raw sewage stream to a settling operation, with or without previous flocculation of the sewage. The settled raw sewage solids are likewise withdrawn as the underflow from the settling operation. The amount of settled, essentially organic solids added to the aqueous suspension is sufficient to significantly increase the total suspended solids to within the range of about 200 to about 10,000 parts of solids per million parts by weight of the admixture. As a general rule, it is desirable to increase the solids content by at least about 50 percent by weight of the initial suspended solids concentration in the suspension to be clarified.

While suspensions of organic solids contemplated for processing in accordance with the invention can vary in solids concentrations over wide ranges, they may be characterized as dilute suspensions. Illustratively, a raw sewage stream will usually contain an amount of suspended solids within the range of as little as 50 parts up to 500 parts per million parts by weight of the stream. Settled organic solids obtained as sewage sludges will contain anywhere from about 0.2 to about 25 percent by weight of settled, essentially organic solids. From a consideration of such concentration values, it is evident that the ratio of the sludge volume to the influent suspension volume to prepare a solids enhanced suspension will vary between wide limits.

By controlling the essentially organic solids content of the suspension, e.g., raw sewage, to be clarified in the foregoing manner, substantial improvements in the total amount of suspended solids, COD (chemical oxygen demand) and BOD (biological oxygen demand) ultimately removed from the system are achieved. Also such results are usually achieved with little or no increase in the requirements for a polymeric flocculant and sometimes even less flocculant is required.

In the practice of the invention, a sewage sludge containing settled, essentially organic solids, which sludge may be a recycle stream, is blended with an aqueous suspension of essentially organic solids, e.g., a raw sewage stream. The sludge blending will normally be accomplished by continuous addition of the sludge to a flowing stream of the suspension. The flow rates will be adjusted so as to provide the resulting blend with a suspended solids concentration within the specified overall concentration range.

A polymeric flocculant for the disperse organic solids is incorporated into the solids enhanced suspension. The amount used is that sufficient to condition the suspended solids for effective flocculation. Thereafter the suspension is subjected to flocculating conditions. The polymeric flocculant may be incorporated directly into the solids enhanced suspension or it may be added to any feed stream of which the solids enhanced suspension is comprised. Also, it is sometimes beneficial to optimum utilization of the polymeric flocculants and optimum purification of the organic suspension to split the flocculant feed among two or more points of possible application. For example, any polymeric flocculant used, or any portion thereof, may be added: (1) to the settled organic solids stream, e.g., sewage sludge, before blending it with the suspension stream; (2) to the suspension to be purified before blending the settled organic solids therein; or (3) to the suspension-settled solids blend, or to any two or three of the foregoing points of flocculant addition.

For best results, the polymeric flocculant should be added to the suspension in the form of a dilute aqueous solution containing from as little as about 0.005 up to possibly as much as 5 percent by weight of the dissolved flocculant. The flocculant, or its solution, is added to the suspension with mixing, preferably mixing whereby a uniform distribution of the flocculant throughout the suspension is accomplished quickly but without turbulent agitation so as to degrade any flocs building up upon the addition of the flocculant. Thereafter, the flocculant treated suspension is flowed into a zone wherein it is mildly agitated to promote flocculation of the disperse solid phase. The flocculated sewage may be separated from its aqueous dispersing medium by any convenient separatory technique. Such a technique might involve one or more operations such as sedimentation, filtration, centrifugation and flotation.

Whenever more than one type of polymeric flocculant is employed, e.g., cationic and anionic polymers, the preferred order of addition of said polymeric flocculants will vary depending upon whether or not the settled organic solids added to the influent suspension have incorporated therein previous additions of a flocculant polymer. A recycled sewage sludge will, for instance, normally contain any flocculant previously added during a flocculation operation and, though such flocculant is largely occluded within the sludge particles, its presence in the sludge will affect the electronegativity of the sludge solids. In some instances, the sludge incorporated into the influent suspension may contain sufficient amounts of incorporated cationic chemical as a result of a previous flocculation operation that the addition of such sludge to the sewage stream imparts an electropositive character to the blended solids and thus the addition thereto of an electronegative polymeric flocculant, such as a polyvinylaromatic sulfonate, produces highly efficient removals of the contaminants upon flocculation and sedimentation.

The polymeric flocculants employed are any of the known flocculants for suspensions comprising essentially organic solids. As previously mentioned, cationic flocculants are normally preferred for this purpose but under special circumstances, particularly when the suspension contains substantial proportions of a cationic chemical, anionic and non-ionic polymeric flocculants can be used effectively. In general, such polymeric flocculants can be characterized as being water-soluble, organic polymers, i.e., hydrophilic colloids, which are substantially linear and macromolecular in size. The terminology "water-soluble," as employed in the characterization of the flocculants, means simply dispersible in water to provide a visually homogeneous system infinitely dilutable with water. The term "linear" means substantially free of cross-linking groups between polymer chains. This includes the various forms of homogeneous and block copolymers, with and without branching, as well as homopolymers. What is considered macromolecular will vary according to the particular polymer species. Usually, however, the better flocculants have molecular weights in excess of about 100,000. Often superior flocculants have molecular weights as great as 2 to 6 million or more.

The preferred polymeric flocculants are the cationic polyelectrolytes which are synthetic, water-soluble polymers containing in or attached along the polmeric chain a plurality of amino, imino or quaternary ammonium groups. These nitrogenous polymers are generally highly effective on normal municipal and industrial sewage streams.

Representative of such cationic, nitrogenous polymeric flocculants are homopolymers and water-soluble copolymers of one or more monomers such as N-vinylpyridine and substituted derivatives thereof; mono-, di-, or trialkylammonium salts, e.g., vinylbenzyl trimethylammonium chloride, allylamine and N-alkyl substituted derivatives thereof, aminoethyl acrylate hydrochloride or aminoethyl methacrylate hydrochloride and, in general, any ammonium or substituted ammonium alkyl acrylate or methacrylate such as N-methyl- or N,N-dimethylaminoalkyl acrylate or methacrylate, wherein the alkyl groups contain 2 or 3 carbons, or the like. . Other suitable cationic, nitrogenous polymers are obtained when a nitrogen containing monomer is copolymerized with one or more other monoethylenically unsaturated monomers capable of undergoing vinyl polymerization, provided that the resulting copolymer is water-soluble and essentially free of anionic substituents. In such copolymers, at least about 5 mole percent, preferably at least 10 mole percent, of the monomers combined in the copolymer should be cationic, nitrogen containing monomers. Suitable monoethylenically unsaturated monomers to be copolymerized with these cationic monomers include acrylamide, methacrylamide, acrylonitrile, the lower alkyl esters of acrylic and methacrylic acids, vinyl methyl ether, N-vinyl oxazolidinone, N-vinyl pyrrolidinone and the like. It should be noted that for the purposes of preparing cationic polymers for the present invention, the amide groups, such as in acrylamide, and nitrile groups, such as in acrylonitrile, are not sufficiently cationic. However, monomers containing these groups can be employed in conjunction with other nitrogenous, cationic monomers to provide highly effective cationic polymers.

When the comonomers employed in the preparation of cationic organic polymers embody water-solubilizing groups, such comonomers may be present in amounts up to 95 mole percent of the combined moieties in the finished cationic, nitrogenous polymer. When hydrophobic comonomers such as the alkyl esters of acrylic and methacrylic acids or styrene are interpolymerized with the cationic monomers, it is necessary, in order to produce a water-soluble polymer, that at least about 60 mole percent of the combined monomer moieties be hydrophilic, i.e., bearing water-solubilizing groups.

A preferred class of cationic polymeric flocculants is represented by water-soluble polyethylenimines of high molecular weight, N-alkyl substituted polyethylenimines and the mineral acid and quaternary ammonium salts thereof. Some polyethylenimines suitable for use in the invention can be represented by the formula:

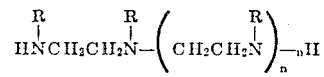

wherein R is hydrogen or methyl and $n$ has a value of at least 400, preferably of at least 2,000. Desirable polyethylenimines can be characterized by the viscosity of aqueous solutions thereof. Thus, water-soluble polyethylenimines having viscosities of at least about 0.8 centistoke and preferably at least 2 centistokes for an aqueous one percent by weight solution thereof are preferred cationic polymers. Also, the various salts of these polymers such as the reaction products thereof with hydrochloric, sulfuric, phosphoric, carbonic and acetic acids are efficient cationic polymers.

Anionic polyelectrolytes which may be employed as polymeric flocculants in the present invention include high molecular weight polyalkanes obtained by the vinyl polymerization of one or more ethylenically unsaturated monomers bearing a carboxylic or sulfonic acid group, or alkali metal salt thereof.

A preferred class of anionic polyelectrolytes for use in accordance with the present invention are the high molecular weight polymers of an alkali metal salt of vinylbenzene sulfonic acid. Such polymers correspond to water-soluble homopolymers of the sulfonate monomers and copolymers thereof prepared by the vinyl polymerization of a major proportion of vinylbenzene sulfonic acid, or an alkali metal salt thereof, with a minor proportion of a monomer copolymerizable therewith such as acrylamide, methacrylamide, acrylonitrile, styrene, vinyltoluene, methyl acrylate and the like. For good results, such polymeric agents should have a molecular weight of at least 1,000,000 and more preferably of at least 4,000,000.

Another variety of anionic polymeric flocculants suitable for use in the invention is constituted by high molecular weight, water-soluble copolymers of styrene and maleic anhydride. Such copolymers are generally employed in the form of the alkali metal salts thereof, preferably the sodium salt, although the acid form obtained by acid hydrolysis of the anhydride rings may also be employed. Preferably, such copolymers have molecular weights of at leaest 1,000,000 and preferably of at least 4,000,000. Further anionic polymeric flocculants are the water-soluble, substantially linear polymers of high molecular weight, obtained by the homopolymerization of acrylic acid, methacrylic acid, sulfoethyl acrylate, carboxyethyl acrylate or water-soluble salts of the foregoing acidic monomers or by the copolymerization of the acidic monomers, or alkali metal salts thereof, with suitable amounts up to about 95 mole percent of other vinyl monomers such as acrylamide and methacrylamide.

The following examples are illustrative of the flocculation process of the invention. It should be understood that the particular conditions utilized in the examples are only representative and intended in no way as limitations on the comprehensive process hereinbefore set forth and hereinafter delineated in the claims.

*Example 1*

The experimental procedure used in carrying out the following examples involved mixing predetermined volumes of a given raw sewage with a given sewage sludge to produce a desired enhanced solids concentration in the resulting blend. A one liter aliquot of the blend was then subjected to flocculation and settling operations. The particular polymeric flocculant used was added to one liter of the blend with mixing provided by a paddle agitator rotated at 50 r.p.m. for 2 minutes. Thereafter the mixing was continued for 15 minutes with the paddle rotation reduced to 25 r.p.m. to achieve flocculation of the suspension. Subsequently, 30 minutes of settling time were allowed in the same vessel and 100 milliliters of the supernatant liquid were withdrawn at a point one inch below the surface of the liquid.

All measurements of suspended solids, both in the sewage to be purified and the supernatant of the settled blend, as well as COD (chemical oxygen demand) and BOD (biological oxygen demand) are made for the purposes of the invention and examples according to standard techniques described in "Standard Methods for the Examination of Water and Waste Water," 11th Edition, American Public Health Association, Inc., New York, New York. The "settled organic solids contents" of sewage sludges and "solids contents" of blends are determined for the purposes herein by filtering an aliquot of the sludge or blend in a Büchner funnel vacuum filter and weighing the filter cake after drying it at 110° C. for 2 hours.

In the first run reported below in Table I, a raw sewage sludge containing about 60,000 parts per million of settled, essentially organic solids was added to a raw sewage containing 105 parts per million of suspended solids in increasing increments to provide a series of blends having predetermined solids concentrations. The initial raw sewage and the solids enhanced blends were flocculated and settled in accordance with the foregoing procedure except that in Run 1 the addition of the polymeric flocculant was omitted. In a second run conducted in a similar manner, except that the raw sewage contained 96 parts per million of suspended solids, a sufficient amount of a polyethylenimine polymeric flocculant having a molecular weight of about 200,000 was added to the sewage, and each blend thereof with sludge, to provide 8 parts polymer per million parts by weight of the suspension.

The residual suspended solids in the supernatant of each system after the flocculation and settling operations were determined as described above. The results of these measurements are reported in the following Table I. The numerical values in the table indicate parts of suspended solids per million parts by weight of the aqueous suspension (p.p.m.).

TABLE I

| Run 1 | | Run 2 | |
| --- | --- | --- | --- |
| Solids Content (p.p.m.) | Supernatant Suspended Solids (p.p.m.) | Solids Content (p.p.m.) | Supernatant Suspended Solids (p.p.m.) |
| 105 (raw sewage) | 30 | 96 (raw sewage) | 16 |
| 1,009 (blend) | 83 | 1,067 (blend) | 5 |
| 2,286 (blend) | 141 | 1,847 (blend) | 6 |
| 3,978 (blend) | 194 | 2,494 (blend) | 5 |
| 5,570 (blend) | 259 | 3,922 (blend) | 14 |
| 7,753 (blend) | 328 | | |

From the foregoing table it will be observed that the increasing solids content in Run No. 1 simply increased the amount of suspended solids remaining in the supernatant. In Run No. 2, however, the residual suspended solids are observed to decrease with the increase in solids content of the blended mixtures.

*Example 2*

To several portions of a raw sewage containing 118 parts per million of suspended solids was added a series of increasing increments of a raw sewage sludge solids containing approximately 80 pounds per ton of dry solids of occluded (added during a pervious flocculation step) polyethylenimine. During the experiments reported below, one liter aliquots of each the raw sewage and blends thereof were treated with 8 parts of polyethylenimine per million parts by weight of the total system. The treated aliquots were flocculated and settled as described above. The initial solids concentration and the remaining suspended solids in the supernatant subsequent to flocculation are reported for each aliquot in the following Table II.

TABLE II

| Solids Content (p.p.m.) | Supernatant Suspended Solids (p.p.m.) |
| --- | --- |
| 118 (raw sewage) | 15 |
| 381 (blend) | 8 |
| 506 (blend) | 1 |
| 949 (blend) | 20 |

The above example illustrates that at some point the removals optimize and that thereafter increasing the solids content of the blends tends to negate the advantages of the process. The exact point of optimization will vary widely, but in a given situation it can be easily discovered by utilizing a procedure like that of the example.

*Example 3*

In another operation similar to that of the foregoing, a raw sewage sludge, pretreated with approximately 80 pounds per ton of polyethylenimine on a suspended solids basis was bended with a raw sewage, said blend containing 516 parts per million by weight of suspended essentially organic solids. This blend was treated with a series of incrementally increasing dosages of a high molecular weight, flocculant grade, sodium polystyrene sulfonate. The remaining suspended solids in the supernatant subsequent to flocculation at each of the doses are set forth below in Table III.

TABLE III

| SPSS Dose (p.p.m.) | Supernatant Suspended Solids (p.p.m.) |
| --- | --- |
| 0 | 39 |
| 1 | 18 |
| 2.5 | 0 |
| 5.0 | 18 |

*Example 4*

In further operations a raw sewage containing 101 parts per million of suspended solids was mixed with an activated sludge, which had been previously treated with the polyethylenimine flocculant employed in Example 2, at the rate of 10 pounds per ton of solids on a dry basis. The influent raw sewage and blends thereof with the pretreated sludge were each dosed at a rate of 1 part of a high molecular weight sodium polystyrene sulfonate per million parts by weight of the aqueous sewage suspension. Subsequent to flocculation and sedimentation steps, the suspended solids in the supernatant of each suspension system was determined as before. The results of these operations are set forth in the following Table IV.

TABLE IV

| Solids Content (p.p.m.) | Supernatant Suspended Solids (p.p.m.) |
|---|---|
| 101 (raw sewage) | 22 |
| 575 (blend) | 15 |
| 1,057 (blend) | 13 |
| 2,008 (blend) | 14 |
| 3,000 (blend) | 5 |
| 4,550 (blend) | 0 |

*Example 5*

In another operation similar to the foregoing, a quantity of an activated sludge containing about 3 percent by weight settled organic solids was added to a raw sewage. The resulting blend was flocculated and settled according to the above procedure. Separate aliquots of the blend were processed, with, and without, the addition of a polymeric flocculant. The polymeric flocculant used was polyethylenimine in an amount of 8 parts polymer per million parts by weight of the blend.

Measurements of the chemical oxygen demand, biological oxygen demand and the suspended solids were made on aliquots of each the raw sewage, the blend and the supernatant from the flocculated and settled blend. The results of these experiments are set forth below in Table V wherein the sewage treatment level is classified in the left hand column and the individual contamination parameters are indicated in the remaining columns. The numerical values reported are again in parts of the indicated contaminating parameter of the suspension per million parts by weight.

TABLE V

| Treatment Stage | COD (p.p.m.) | BOD (p.p.m.) | Sus. Solids (p.p.m.) |
|---|---|---|---|
| Raw sewage | 327 | 161 | 151 |
| Blend | 2,320 | 900 | 2,795 |
| Stirred and settled blend (no polymer) | 150 | 42 | 50 |
| Stirred and settled blend (with polymer) | 103 | 16 | 19 |

From the foregoing it will be observed that in addition to good results in the removal of suspended solids, excellent separations of COD and BOD are also achieved.

What is claimed is:

1. In a process for flocculating a dilute aqueous suspension of sewage solids which comprises the steps of treating the suspension with a sufficient amount of a synthetic organic polymeric flocculant for the suspension solids to condition the solids for flocculation and flocculating the treated suspension, the improvement which consists in blending into the suspension, prior to the flocculating step, a sufficient amount of settled sewage solids to increase the solids content of the suspension by at least 200 percent by weight of the initial suspended solids content of the suspension and to a level within the range from about 200 to about 10,000 parts of solids per million parts by weight of the blended system.

2. A method as in claim 1 wherein a portion of the polymeric flocculant used to condition the solids for flocculation is added to the settled sewage solids prior to their blending with the suspension.

3. A method as in claim 1 wherein the settled sewage solids used is a raw sewage sludge.

4. A method as in claim 1 wherein the settled sewage solids used is an activated sewage sludge.

5. A method as in claim 1 wherein the polymeric flocculant employed is a water-soluble cationic, nitrogenous organic polymer.

6. A process as in claim 1 wherein the sewage solids are conditioned with the polymeric flocculant prior to the blending of the settled sewage solids.

7. A process as in claim 1 wherein the settled sewage solids are blended with the aqueous suspension of sewage solids prior to treating the suspension with the polymeric flocculant.

References Cited by the Examiner

UNITED STATES PATENTS 3,142,638   7/1964   Blaisdell et al. _____ 210—52

OTHER REFERENCES

Steel, Water Supply and Sewerage, 1947, Second Edition, McGraw-Hill, New York, page 588.

MORRIS O. WOLK, *Primary Examiner.*

M. E. ROGERS, *Assistant Examiner.*